United States Patent
Ward et al.

(10) Patent No.: US 8,616,850 B2
(45) Date of Patent: Dec. 31, 2013

(54) GAS TURBINE ENGINE BLADE MOUNTING ARRANGEMENT

(75) Inventors: Eric J. Ward, West Palm Beach, FL (US); Brian K. Richardson, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 799 days.

(21) Appl. No.: 12/814,098

(22) Filed: Jun. 11, 2010

(65) Prior Publication Data

US 2011/0305576 A1 Dec. 15, 2011

(51) Int. Cl.
*F01D 5/02* (2006.01)

(52) U.S. Cl.
USPC ............... 416/204 R; 416/204 A; 416/219 R; 416/220 R; 416/221; 416/500

(58) Field of Classification Search
USPC .......... 416/204 R, 204 A, 219 R, 220 R, 221, 416/500; 267/158–160
See application file for complete search history.

(56) References Cited

U.S. PATENT DOCUMENTS

| | | | |
|---|---|---|---|
| 3,936,234 A | 2/1976 | Tucker et al. | |
| 4,208,170 A | 6/1980 | Tucker et al. | |
| 5,123,813 A | 6/1992 | Przytulski et al. | |
| 5,443,366 A * | 8/1995 | Knott et al. ................... | 416/221 |
| 5,501,575 A | 3/1996 | Eldredge et al. | |
| 6,398,499 B1 | 6/2002 | Simonetti et al. | |
| 6,431,835 B1 | 8/2002 | Kolodziej et al. | |
| 6,481,971 B1 | 11/2002 | Forrester | |
| 6,694,723 B2 | 2/2004 | Ward | |
| 7,334,996 B2 | 2/2008 | Corbin et al. | |

FOREIGN PATENT DOCUMENTS

DE 102007003596 A1 * 7/2008

OTHER PUBLICATIONS

Matthias Voigt, Translation of abstract for foreign patent DE102007003596, Translated on Mar. 21, 2013.*

* cited by examiner

*Primary Examiner* — Igor Kershteyn
(74) *Attorney, Agent, or Firm* — O'Shea Getz P.C.

(57) ABSTRACT

A mounting arrangement for a gas turbine engine blade having a root employs a lightweight, simple and economical leaf spring spacer which biases the blade root in a radially outward direction to minimize unwanted movement of the root within a conforming slot in a blade hub under conditions such as windmilling when centrifugal force alone is inadequate to tightly seal the root within the slot.

20 Claims, 4 Drawing Sheets

FIG.3
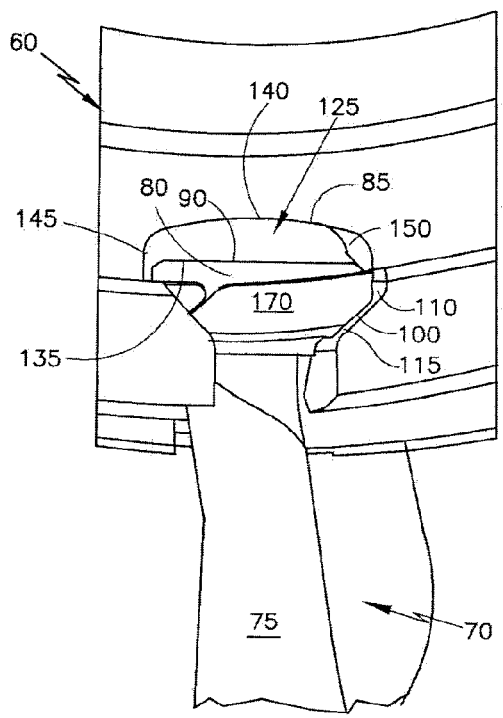
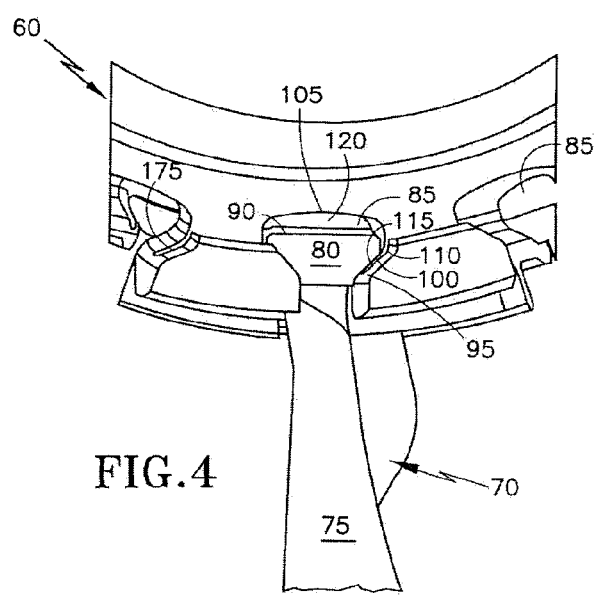
FIG.4

GAS TURBINE ENGINE BLADE MOUNTING ARRANGEMENT

BACKGROUND OF THE INVENTION

1. Technical Field

This invention relates generally to gas turbine engines and particularly to a mounting arrangement for gas turbine engine blades such as fan blades.

2. Background Information

Turbofan gas turbine engines such as those which power aircraft employ a multiplicity of fan blades attached to a hub mounted on the forward (upstream) end of one of the engine shafts. Typically, such fan blades are provided with a radially outer airfoil shaped portion and a radially inner root portion typically having a dovetail shape. The dovetail shaped root portion is received within a slot which conforms thereto in the fan hub. For ease in attaching the fan blade to the hub by sliding the root portion into the slot and for removal of the blade from the hub by sliding the root portion of the blade out of the slot, the slot is usually slightly larger than the dovetail root portion. This difference in dimensions between the root portion of the fan blade and the slot in the hub results in a clearance between the root portion and the slot. Under normal engine operating conditions when the engine's rotor is spinning at high speed (several thousand rpm) centrifugal force acting on the fan blade causes the blade to be held tightly in the hub slot.

However, when the engine is not in use, wind acting on the fan blades can cause the engine's rotor to slowly turn. This slow turning of the engine rotor in response to winds acting on the fan blades is referred to as windmilling. There is very little centrifugal force acting on the fan blades during such windmilling due to the low rotational speed of the engine rotor in response thereto and thus, the fan blade roots are not tightly held within the conforming slots in the fan hub, resulting in movement between the fan blade root portions and the hub slots in which they are received. This movement of the fan blade root portions within the slots, if unchecked, can result in damage to the fan blade root portions and the slots due to galling and fretting of the surfaces of the root portions and the slots. To minimize such galling and fretting, it has been a practice to employ spacers between the radially innermost end of the root portion and the adjacent portion of the slot which receives the root portion to prevent movement between the blade and the hub during windmilling of the engine's rotor. In some cases, such spacers actually resiliently bias the root portion and thus the entire blade radially outwardly to tightly secure the blade root portion within the hub slot. Such prior art blade root spacers have taken the form of relatively complex metallic configurations and elastomeric materials secured between rigid clamping members which adjustably compress the elastomeric material to control the elasticity thereof. The complexity and weight of such prior art blade root spacers adds to the cost and weight of the engine, thus detracting from the efficiency thereof. Furthermore, the complexity of such spacers detracts from the ease with which the fan blades are assembled to the hub during engine assembly and removed from the hub for engine maintenance.

Accordingly, it will be appreciated that a need exists for a simple, lightweight and economical means for minimizing movement of fan blade roots within fan hub slots under conditions such as windmilling and the like.

SUMMARY OF THE DISCLOSURE

In accordance with the present invention, a lightweight, simple and economical leaf spring spacer is disposed between a radially innermost end of a gas turbine engine blade root such as a fan blade root and an adjacent radially innermost surface of a hub slot which accommodates that root. The spacer is held in place by an interference fit between the blade root and the slot such that the spacer exerts a radially outward force on the blade root to secure the blade root within the slot thereby limiting unwanted radial movement and tilting of the blade root within the slot during such conditions as windmilling of the gas turbine engine rotor. In an exemplary embodiment, the blade comprises a fan blade. Also in the exemplary embodiment, the blade root is dovetail shaped, including a pair of radially inner and outer angularly offset longitudinally extending side surfaces, and the slot includes a pair of radially inner and outer angularly offset longitudinally extending side surfaces which are opposed to the radially inner and outer side surfaces of the blade root. The leaf spring spacer is compressed between the radially innermost surfaces of the blade root and the slot which accommodates the root exerting a radially outward force on the root which causes the radially outer side surface of the blade root to bear against the radially outer side surface of the slot, thereby preventing radial movement of the blade root within the slot during the aforementioned windmilling conditions.

According to an aspect of the present invention, a mounting arrangement for a gas turbine engine blade is provided. The mounting arrangement includes a radially directed axis and a radially inner root received within a slot in an associated blade hub. The mounting arrangement also includes an elongate resilient leaf spring spacer received within said slot between a radially innermost end of said blade root and a radially innermost surface of said slot by interference fit therebetween such that said spacer exerts a radially outward force on said blade root to reduce radial movement of said blade root within said slot.

BRIEF DESCRIPTION OF THE DRAWINGS

FIG. 3 is a partial front elevation of the fan blade and hub shown in FIG. 2 taken in a direction of line 3-3 of FIG. 2;

FIG. 4 is a partial front elevation similar to FIG. 3 but showing the blade mounting arrangement of the present invention in a state of partial assembly;

DETAILED DESCRIPTION OF THE INVENTION

Figure 1:
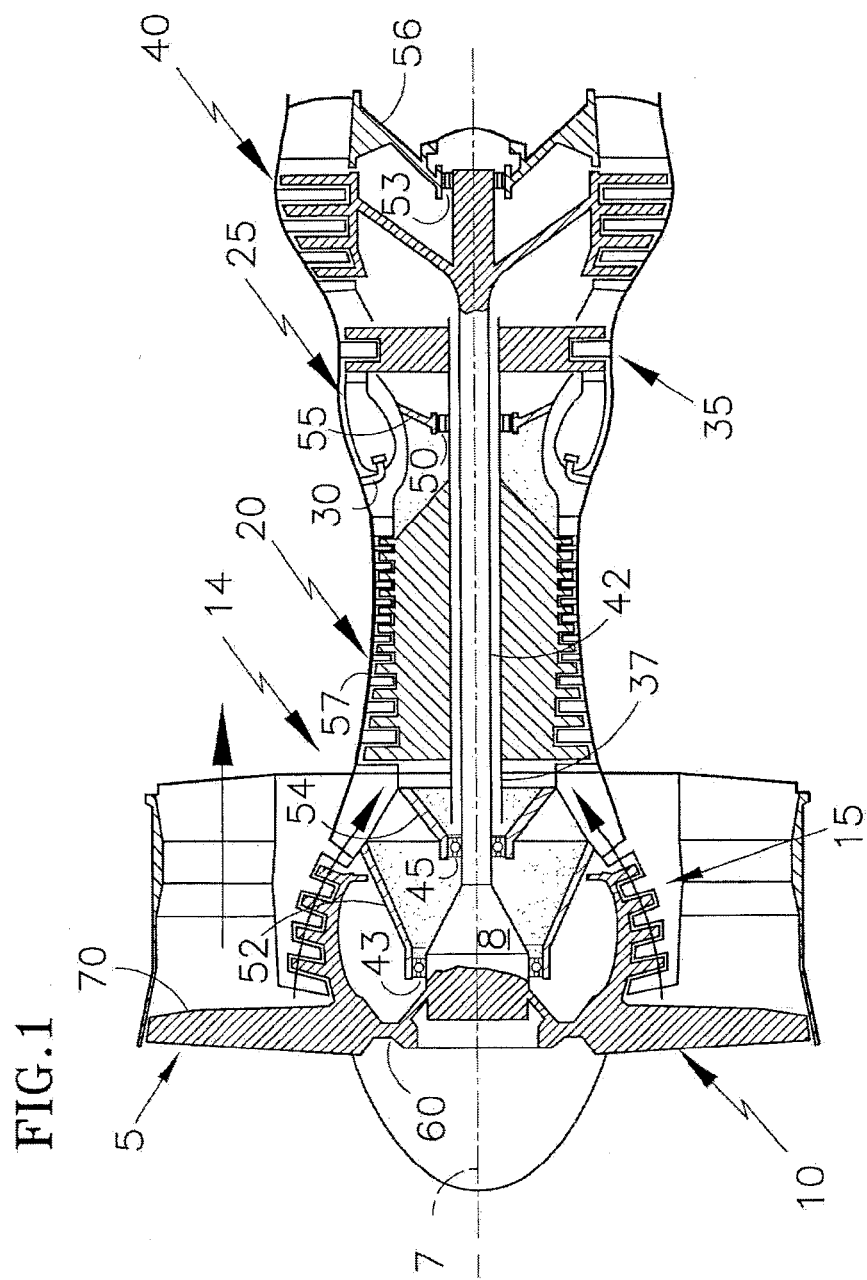
FIG. 1 is a schematic view of a turbofan gas turbine engine of the type employing the present invention.

Referring to FIG. 1, a turbofan gas turbine engine 5 has a longitudinal axis 7 about which the rotors 8 of the engine rotate. A fan 10 disposed at the engine inlet draws air into the engine. A low pressure compressor 15 located immediately downstream of fan 10 compresses air exhausted from fan 10 and a high pressure compressor 20 located immediately downstream of low pressure compressor 15, further compresses air received therefrom and exhausts such air to combustors 25 disposed immediately downstream of high pressure compressor 20. Combustors 25 receive fuel through fuel injectors 30 and ignite the fuel/air mixture. The burning fuel-air mixture (working medium fluid) flows axially to a high pressure turbine 35 which extracts energy from the working medium fluid and in so doing, rotates hollow shaft 37, thereby driving the rotor of high pressure compressor 20. The working medium fluid exiting the high pressure turbine 35 then enters low pressure turbine 40, which extracts further energy from the working medium fluid. The low pressure turbine rotor provides power to drive the fan 10 and low pressure compressor 15 via low pressure shaft 42, which is disposed interiorly of the hollow shaft 37, coaxial thereto. Working medium fluid exiting the low pressure turbine 40 provides axial thrust for powering an associated aircraft (not shown) or a free turbine (also not shown).

Bearings 43, 45, 50 and 53 radially support the concentric high pressure and low pressure turbine shafts from separate frame structures 52, 54, 55 and 56 respectively, attached to engine case 57, which defines the outer boundary of the engine's stator which circumscribes rotors 8. However, it will be appreciated that the present invention is also well suited for mid-turbine frame engine architectures wherein the upstream bearings for the low and high pressure turbines are mounted on a common frame structure disposed longitudinally (axially) between the high and low pressure turbines.

Figure 2:
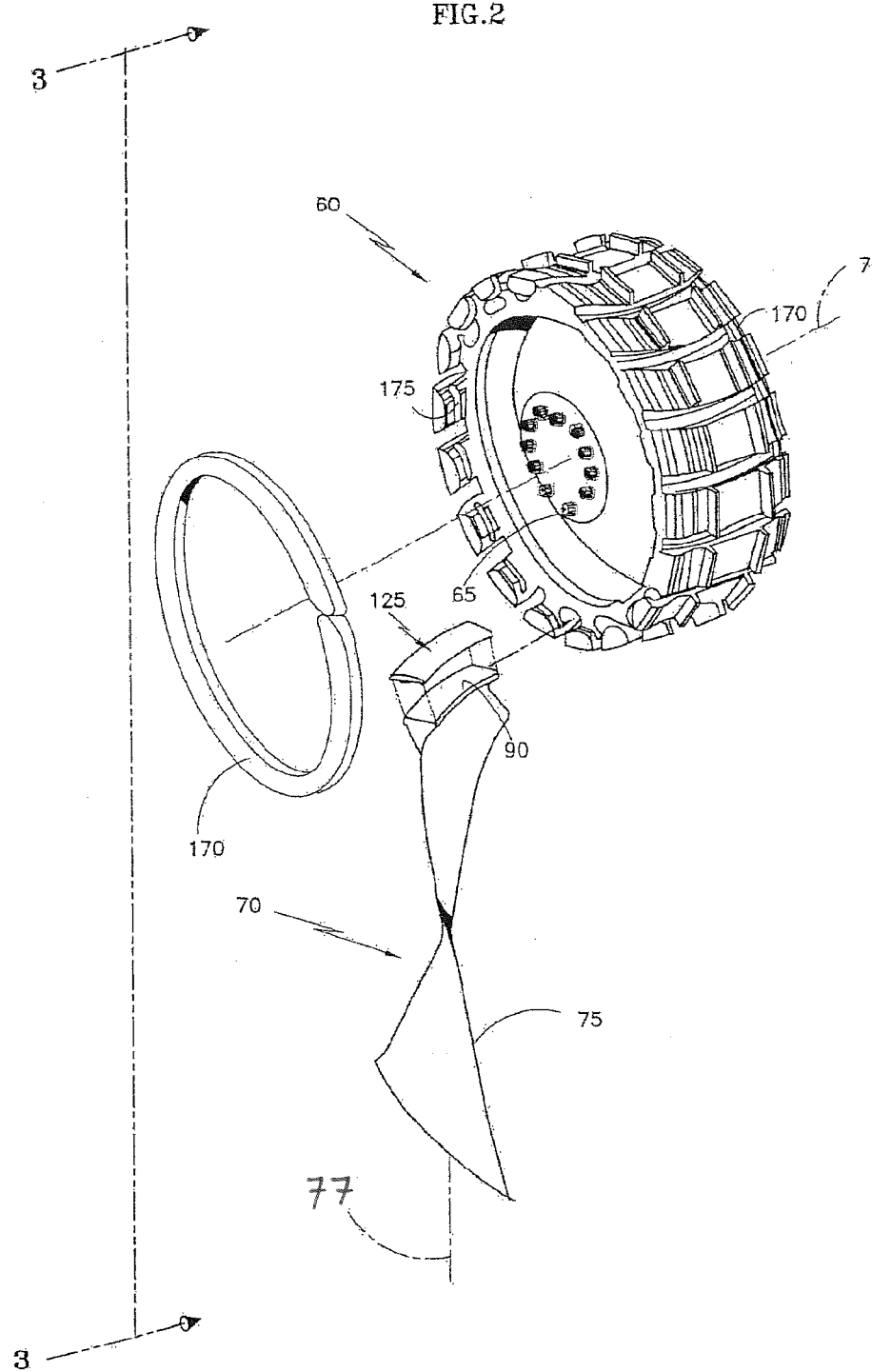
FIG. 2 is an exploded isometric view of a fan hub and an associated fan blade employed in the turbofan engine of FIG. 1.

Referring to FIGS. 1-4, the fan 10 comprises a hub 60 mounted on the forward end of low pressure shaft 42 as by bolts 65 and a plurality of blades 70 mounted on hub 60 about the periphery thereof. As best seen in FIG. 2, each of the blades 70 has a radial central axis 77 and comprises a radially outer airfoil shaped portion 75 which in a manner well known in the art draws air into the engine and a radially inner root portion 80 which is received within a conforming slot 85 in the periphery of hub 60. The blades 70 may be formed from a metallic material such as titanium or an alloy thereof, a composite such as a glass-epoxy composite or any combination thereof as is well known in the art. As best seen in FIG. 4, root portion 80 is generally dovetail shaped in cross-section, being defined by the radially innermost end of the airfoil portion 75, a longitudinally extending radially innermost surface 90, and a pair of longitudinally extending angularly offset side surfaces 95 and 100. As set forth hereinabove, each slot 85 in hub 60 which receives a dovetail root of one of the fan blades 70 conforms to that root, and includes a longitudinally extending radially innermost surface 105 facing (opposed to) surface 90 of blade root 80 as well as angularly offset radially inner and outer side surfaces 110 and 115 which face (are opposed to) side surfaces 95 and 100 of root portion 80.

It will be appreciated that to enable root portion 80 to be inserted into slot 85 for assembly and removed therefrom for disassembly of the fan blades from the hub, slot 85 must be dimensionally larger than dovetail root 80 thereby defining a clearance (e.g., a radial clearance) 120 therebetween. As set forth hereinabove, under windmilling conditions, when the engine is not running and the fan is turned slowly by wind entering the engine, clearance 120 would allow limited radial movement and tilting of blade 70 within slot 85, thereby causing unwanted wear between the root portion 80 of the blade 70 and the slot side surfaces 95, 100 due to frictional galling and/or fretting between the dovetail root portion 80 and the slot 85. To prevent such wear of the root portion and slot during such windmilling conditions, a leaf spring spacer 125 (see FIG. 3) is disposed within clearance 120 between radially innermost surface 90 of blade root 80 and radially innermost surface 105 of slot 85.

Figure 5:
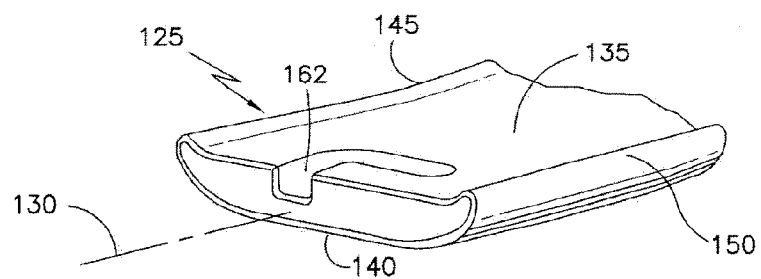
FIG. 5 is an isometric view of a blade root spacer employed in the blade mounting arrangement of the present invention.
Figure 6:
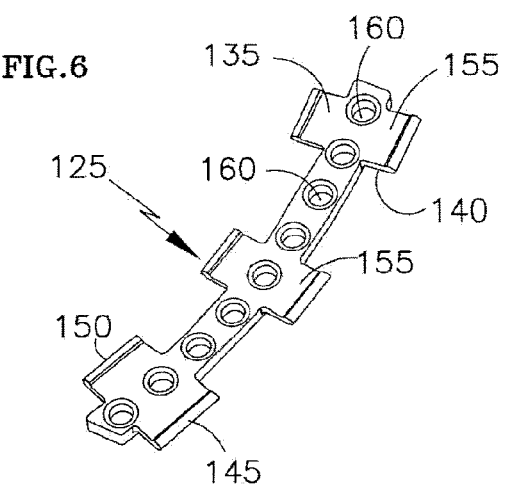
FIG. 6 is an isometric view of an alternate embodiment of the spacer shown in FIG. 5.
Figure 7:
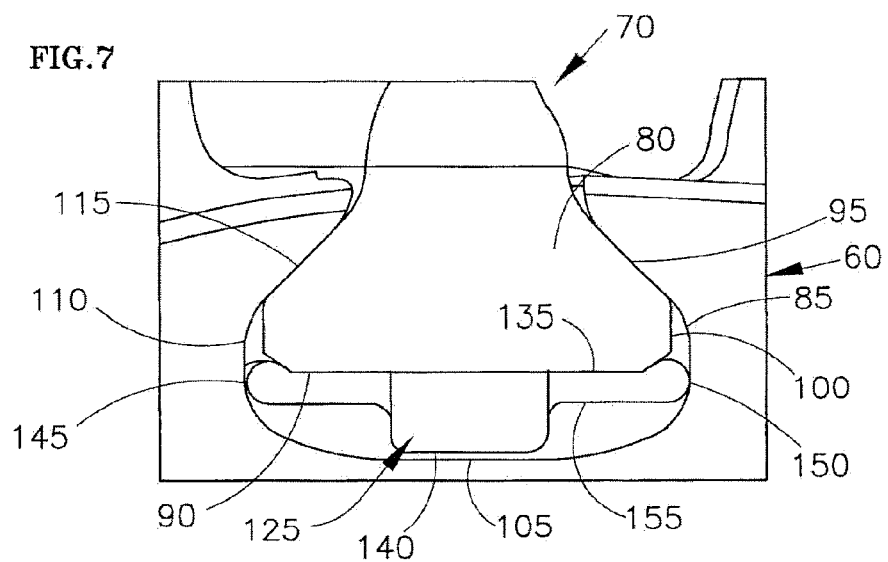
FIG. 7 is a front elevation view similar to FIG. 3 of the blade mounting arrangement of the present invention employing the alternate embodiment of the spacer shown in FIG. 5.

Referring to FIGS. 3 and 5-7, the leaf spring spacer 125 includes a longitudinal axis 130 which, when the spacer is assembled with the blade 70 and the hub 60, is generally parallel to the longitudinal axis 7 of the engine itself. The spacer may be formed from any material having the requisite strength and elasticity such as any of various thermoplastic materials such as Vespel TP-3985 manufactured and sold by E.I. DuPont de Nemours and Company. The leaf spring spacer 125 is bowed in a radial direction and is retained between root portion 80 and slot 85 by an interference fit therebetween. The leaf spring spacer 125 includes first and second opposed longitudinally extending major surfaces 135 and 140 and a pair of opposed longitudinally extending lateral side edge portions 145 and 150. The side edge portions 145, 150 may be smooth as shown in FIG. 5 or notched along the lengths thereof to define tabs 155 as shown in FIG. 6. The lateral side edge portions may be generally coplanar to the main body of the spacer or may be radially bent to fill any clearance between the side surfaces 95, 100 of the dovetail root 80 and slot 85. Furthermore, the leaf spring spacer 125 may be of a uniform thickness or may include thickened portions thereof either along substantial portions of edges 145 and 150 or along the edges of tabs 155 (see FIG. 6). Such thickened portions 145, 150 of leaf spring spacer 125 may conveniently fill any clearances between the root portion 80 of the blade 70 and the disk slot 85 defined by beveled edges of the blade root 80 between adjacent surfaces thereof (see FIG. 7). Also, leaf spring spacer 125 may include a groove 162 for cooperation with a suitable removal tool (not shown) used in removing the spacer in the disassembly of the fan blade from the hub. As shown in FIG. 6, to minimize the weight which the leaf spring spacer 125 adds to the fan rotor, the leaf spring spacer 125 may be apertured at one or more locations 160 along length thereof. The apertures 160 are also useful to accommodate balance weights (not shown) which may be necessary to properly balance the fan rotor in the assembly thereof.

A fan blade 70 is mounted on the hub 60 by first positioning the hub 60 such that the slot 85 in which a fan blade 70 is to be inserted is located at a bottom dead center position and the aft retaining ring is then installed. The blade 70 is then slid into the slot 85 and released so that the radially outer side surface 95, 100 of the root 80 rests on the opposed surface of the slot 85. Leaf spring spacer 125 is then inserted into the slot. Referring to FIGS. 2 and 3, the forward retaining ring 170 is then installed in mating grooves 175 in the periphery of the hub 60 to longitudinally restrain the blade root 80 within the slot 85.

Accordingly, it will be appreciated that the blade mounting arrangement of the present invention provides a lightweight, economical and effective arrangement for securing a fan blade 70 to a hub 60 to minimize movement therebetween under windmilling conditions. The simple compact shape of the leaf spring spacer 125 adds minimally to the weight of the fan rotor. No complex and/or heavy mechanisms are necessary to effectively hold the blade root 80 within the hub 60.

While the present invention has been described within the context of a gas turbine engine fan blade mounting arrangement, it will be appreciated that the present invention may be employed in the mounting of various other blades to a gas turbine engine rotor such compressor blades or turbine blades. While specific shapes and materials for the blade spacers employed in the present invention have been discussed, it will be appreciated that various modifications thereto may be made without departing from the present invention and it is intended by the appended claims to cover such modifications as may fall within the true spirit and scope of this invention.

Having thus described the invention, what is claimed is:

1. A mounting arrangement for a gas turbine engine blade having a radially directed axis and a radially inner root received within a slot in an associated blade hub, said mounting arrangement including an elongate resilient leaf spring spacer received within said slot between a radially innermost end of said blade root and a radially innermost surface of said slot by interference fit therebetween such that said spacer exerts a radially outward force on said blade root to reduce radial movement of said blade root within said slot.

2. The mounting arrangement of claim 1 wherein said leaf spring spacer is radially bowed.

3. The mounting arrangement of claim 1 wherein said blade comprises a fan blade.

4. The mounting arrangement of claim 1 wherein said hub comprises a disk.

5. The mounting arrangement of claim 1 wherein said radially innermost end of said blade root and said radially innermost surface of said slot comprise a pair of opposed longitudinally extending surfaces generally normal to said blade axis.

6. The mounting arrangement of claim 1 wherein said blade root is dovetail shaped including a pair of radially inner and outer angularly offset, longitudinally extending side surfaces and said slot includes a pair of radially inner and outer angularly offset longitudinally extending side surfaces opposed to said radially inner and outer side surfaces of said blade root, said radially outward force exerted by said leaf spring spacer causing said radially outer side surface of said blade root to bear against said radially outer side surface of said slot.

7. The mounting arrangement of claim 1 wherein said leaf spring spacer includes a longitudinal axis generally parallel to said axis of said gas turbine engine, a pair of opposed, radially inner and outer longitudinally extending major surfaces and a pair of opposed lateral side edges, each of said side edges including at least one tab extending outwardly therefrom.

8. The mounting arrangement of claim 7 wherein said tab bears against said radially innermost end of said blade root.

9. The mounting arrangement of claim 7 wherein said blade root is dovetail shaped including a pair of radially inner and outer angularly offset longitudinally extending side surfaces, and wherein said tab includes an outer end portion which bears against said radially inner side surface of said dovetail shaped blade root.

10. The mounting arrangement of claim 1 wherein said leaf spring spacer is formed from a thermoplastic.

11. A blade root spacer for mounting a gas turbine engine fan blade at a root portion thereof to a hub therefore, said blade root spacer comprising a radially bowed, elongate leaf spring comprising first and second major surfaces adapted to bear against a radially innermost surface of said fan blade root and an opposed radially innermost surface of a mounting slot in an associated fan blade hub, said leaf spring comprising a pair of inner and outer longitudinally extending major surfaces and a pair of generally parallel opposed lateral side edges.

12. The blade root spacer of claim 11 wherein said lateral side edges are thickened for filling a clearance between a beveled edge of said fan blade root portion and an adjacent portion of a mating slot in said hub.

13. The blade root spacer of claim 12 wherein each of said side edges includes at least one tab extending outwardly therefrom.

14. The blade root spacer of claim 11 wherein said blade root spacer is apertured along at least a portion of the length thereof.

15. The blade root spacer of claim 11 wherein said blade root spacer comprises a thermoplastic.

16. A mounting arrangement for a gas turbine engine blade having a radially directed axis and a radially inner root received within a slot in an associated blade hub, said mounting arrangement including an elongate resilient leaf spring spacer comprising radially inner and outer major surfaces that extend between opposed lateral side edges, wherein said spacer is received within said slot between a radially innermost end of said blade root and a radially innermost surface of said slot by interference fit therebetween such that said radially outer major surface of said spacer exerts a radially outward force on said blade root to reduce radial movement of said blade root within said slot.

17. The mounting arrangement of claim 16, wherein said spacer includes a longitudinal axis generally parallel to said axis of said gas turbine engine, and wherein said radially inner and outer major surfaces extend longitudinally.

18. The mounting arrangement of claim 16 wherein each of said side edges including at least one tab extending outwardly therefrom.

19. The mounting arrangement of claim 18 wherein said tab bears against said radially innermost end of said blade root.

20. The mounting arrangement of claim 18 wherein said blade root is dovetail shaped including a pair of radially inner and outer angularly offset longitudinally extending side surfaces, and wherein said tab includes an outer end portion which bears against said radially inner side surface of said dovetail shaped blade root.

* * * * *